(12) United States Patent
Jo et al.

(10) Patent No.: US 9,552,468 B2
(45) Date of Patent: Jan. 24, 2017

(54) IMAGE PROCESSING APPARATUS AND CONTROL METHOD THEREOF

(71) Applicant: SAMSUNG ELECTRONICS CO., LTD., Suwon-si (KR)

(72) Inventors: Eun-heui Jo, Suwon-si (KR); Sang-yoon Kim, Yongin-si (KR); Kyoung-jae Park, Daejeon (KR); Ki-jun Jeong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/539,255

(22) Filed: Nov. 12, 2014

(65) Prior Publication Data

US 2015/0154391 A1    Jun. 4, 2015

(30) Foreign Application Priority Data

Nov. 29, 2013  (KR) .................. 10-2013-0147511

(51) Int. Cl.
*H04L 29/00*   (2006.01)
*G06F 21/32*   (2013.01)
*G06F 21/10*   (2013.01)

(52) U.S. Cl.
CPC ............ *G06F 21/32* (2013.01); *G06F 21/10* (2013.01); *G06F 2221/0775* (2013.01)

(58) Field of Classification Search
CPC .................................. G06K 9/00; G06F 15/16
USPC .......................................................... 726/19
See application file for complete search history.

(56) References Cited

U.S. PATENT DOCUMENTS

| 7,085,840 | B2 * | 8/2006 | de Jong ............. H04L 63/0407 380/255 |
| 7,545,961 | B2 * | 6/2009 | Ahern ..................... G06F 21/32 382/115 |
| 8,582,831 | B2 * | 11/2013 | Miura ................ G06K 9/00013 340/5.53 |
| 2007/0189583 | A1 * | 8/2007 | Shimada .............. G06K 9/2018 382/118 |

FOREIGN PATENT DOCUMENTS

KR    10-0876300 B1    12/2008
KR    10-1271171 B1    6/2013

* cited by examiner

*Primary Examiner* — William Goodchild
*Assistant Examiner* — Michael D Anderson
(74) *Attorney, Agent, or Firm* — Sughrue Mion, PLLC

(57) ABSTRACT

An image processing apparatus is provided, including a user input interface to input biometric information of at least one user, a processor to process image data to be displayed as an image and to provide a preset service to authenticate a personal identification (ID) and the group ID of a user group including users corresponding to personal IDs, and a controller to specify a personal ID corresponding to biometric information of an input through the user input interface, and to select and authenticate the group ID corresponding to specified personal IDs from the storage when multiple personal IDs are specified. The controller derives interest of the multiple users corresponding to the respective specified personal IDs in the image and selects the group ID corresponding to a personal ID of a user determined to have a high interest.

18 Claims, 8 Drawing Sheets

IMAGE PROCESSING APPARATUS AND CONTROL METHOD THEREOF

CROSS-REFERENCE TO RELATED APPLICATION

This application claims priority from Korean Patent Application No. 10-2013-0147511, filed on Nov. 29, 2013 in the Korean Intellectual Property Office, the disclosure of which is incorporated herein by reference.

BACKGROUND

Field

Apparatuses and methods consistent with the exemplary embodiments relate to an image processing apparatus to process image data to be displayed as an image and a control method thereof, more particularly to an image processing apparatus configured to specify at least one user and to provide a particular recommendation service to the specified user and a control method thereof.

Description of the Related Art

An image processing apparatus processes image signals/image data externally received according to various image processing processes. The image processing apparatus may display an image based on the processed image signal on its own display panel or output the processed image signal to a separate display apparatus including a panel so that an image is displayed on the display apparatus. That is, the image processing apparatus may include any device capable of processing an image signal, regardless of whether it includes a panel to display an image or does not. An image processing apparatus having a display panel is a TV, while an image processing apparatus having no display panel is a set-top box.

A variety of additional and extended functions are continuously added to the image processing apparatus as technology develops. For example, a user may register at least one user account in the image processing apparatus, and the image processing apparatus may provide a specialized service for each, such as a login account when the user logs in to the account. The image processing apparatus allows the user to designate an ID and a password for login to the user account in advance. When the user inputs the ID and password using character or number buttons installed on a remote controller, login to the user account corresponding to the input information may be carried out.

However, the account of the image processing apparatus is arranged corresponding to each individual user. In the case that the image processing apparatus is available to a plurality of users at the same time, like a home TV, when a service is provided to suit an account of one user among a plurality of users, the service does not consider the other users. Thus, when a plurality of users uses the image processing apparatus at the same time, the image processing apparatus may need to provide a service in view of not only one user but the plurality of users.

SUMMARY

According to an aspect of one exemplary embodiment, there is provided an image processing apparatus including a user input interface configured to input biometric information of at least one user, a processor configured to process image data to be displayed as an image and to provide a preset service to authenticate at least one of a personal identification (ID) and a group ID of a user group comprising a plurality of users corresponding to a plurality of personal IDs, and a controller configured to specify a personal ID of an individual user corresponding to biometric information of at least one user input through the user input interface, and to select and authenticate the group ID corresponding to specified personal IDs from the storage when a plurality of personal IDs are specified, wherein the controller derives interest of the plurality of users corresponding to the respective specified personal IDs in the image, and selects the group ID corresponding to a personal ID of a user determined to have high interest among the specified personal IDs.

The interest may be derived based on a motion of the at least one user indicated by the biometric information of the at least one user.

The controller may determine that the interest is high when the interest is greater than a preset threshold.

The interest may be derived based on at least one from among a body position of the at least one user, a direction in which the eyes of the at least one user look, and a face position of the at least one user.

The controller may give the interest a highest value when an angle between a line in a direction in which at least one from among a body, a face, and eyes of the user is pointed and a forward normal line of the image is 0 degrees, and may give the interest a lower value when the angle becomes wider.

The image processing apparatus may also include a storage configured to store a personal identification (ID) of an individual user and a group ID of a user group including a plurality of users corresponding to a plurality of personal IDs, where the storage may store a use history of content corresponding to the group ID, and the controller may provide a content recommendation service indicating content information with a preference for the group ID based on the use history.

The controller may determine that content watched a preset number of times or more among contents in the use history has the preference.

The controller may update the content information on a currently displayed image in the use history to correspond to the group ID.

The user input interface may include a camera, and the biometric information of the at least one user may include image information of the at least one user taken by the camera.

The user input interface may include a microphone, and the biometric information of the at least one user may include voice information of the at least one user input received through the microphone.

According to an aspect of another exemplary embodiment, there is provided a control method of an image processing apparatus, the control method including: displaying an image; receiving biometric information of at least one user; authenticating the biometric information of the user corresponding to at least one from among a personal identification (ID) of an individual user and a group ID of a user group including a plurality of users corresponding to a plurality of personal IDs, the personal IDs and the group ID being pre-stored; and providing a preset service to authenticate at least one from among the personal IDs and the group ID, wherein the authenticating the at least one from among the personal IDs and the group ID corresponding to the biometric information of the at least one user includes deriving an interest of the plurality of users corresponding to the respective personal IDs in the image when the plurality of personal IDs corresponds to the biometric information of the at least one user, and selecting and authenticating the group ID corresponding to a personal ID of the at least one user determined to have a high interest among the personal IDs.

The interest may be derived based on a motion of the at least one user indicated in the biometric information of the at least one user.

The deriving the interest may include determining that the interest is high when the interest is greater than a preset threshold.

The interest may be derived based on at least one of a body position of the at least one user, a direction in which the eyes of the at least one user look, and a face position of the at least one user.

The deriving the interest may include giving the interest a highest value when an angle between a line in a direction in which at least one from among a body, a face, and eyes of the at least one user is pointed and a forward normal line of the image is 0 degrees, and giving the interest a lower value when the angle becomes wider.

The image processing apparatus may store a use history of content corresponding to the group ID, and the providing the preset service may include providing a content recommendation service indicating content information with a preference of the group ID based for the group ID based on the use history.

The providing the content recommendation service may include determining that content watched a preset number of times or more among contents in the use history has the preference.

The providing the preset service may include updating the content information on a currently displayed image in the use history to correspond to the group ID.

The biometric information on the at least one user may include image information of the at least one user taken by a camera.

The biometric information on the at least one user may include voice information of the at least one user input through a microphone.

According to an aspect of another exemplary embodiment, there is provided a display apparatus including an input interface configured to input information of at least one user, a controller configured to control the display apparatus, and a processor configured to process received data signals and display an image according to the proceed data signals. The controller controls the processor to display the image to be displayed according to the information of the at least one user and a stored data.

The display apparatus may further include a storage configured to store data including a control of the controller and the information of the at least one user.

The controller may determine if a user is watching the display according to the biometric information of the at least one user.

According to another exemplary embodiment, there exists a method of controlling a display apparatus, the method including, inputting information of at least one user, controlling the display of the apparatus according to the information of the at least one user, storing data including control information and the information of the at least one user, processing received data signals, and displaying an image according to the processed data signals. The controlling controls the displaying the image to be displayed according to the information of the at least one user and the stored data.

The information of the at least one user may include biometric information.

The controlling may determine if a user is watching the display according to the biometric information of the at least one user.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Hereinafter, exemplary embodiments will be described in detail with reference to the accompanying drawings. In the following description, constituent parts or elements directly related to the exemplary embodiments will be described only, and descriptions of other parts or elements will be omitted. However, it should be noted that the omitted parts or elements are not construed as being unnecessary in configuring a device or system according to the exemplary embodiments.

Figure 1:
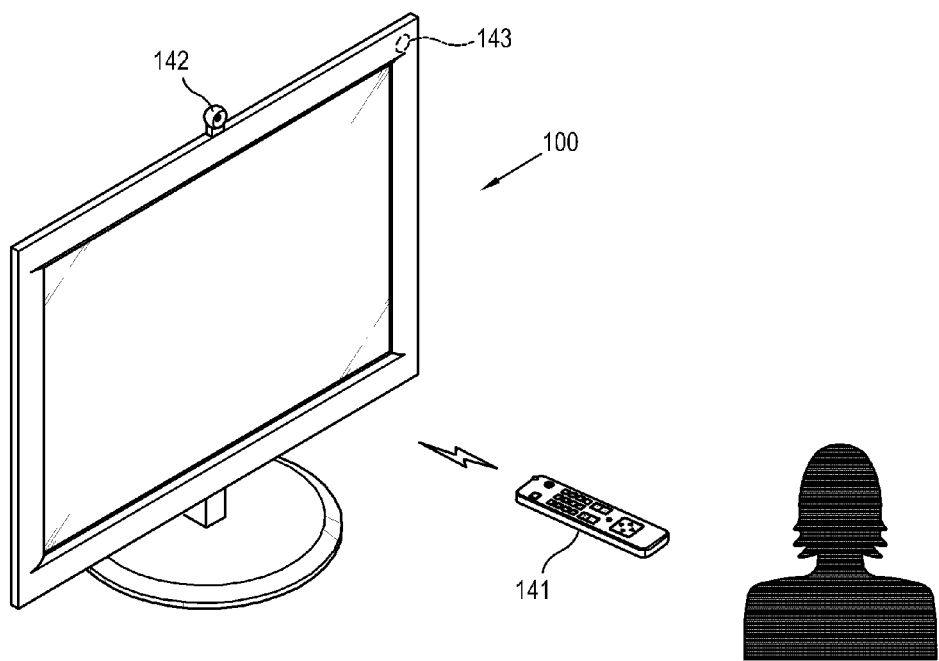
FIG. 1 illustrates an image processing apparatus or a display apparatus according to a first exemplary embodiment.

FIG. 1 illustrates an image processing apparatus or a display apparatus 100 according to a first exemplary embodiment. The image processing apparatus 100 according to the present embodiment is a display apparatus which is capable of autonomously displaying an image. In the present embodiment, however, an image processing apparatus 100 incapable of autonomously displaying an image may also be employed, in which case the image processing apparatus 100 is locally connected to a separate external display apparatus to display an image on the external display apparatus.

As shown in FIG. 1, the display apparatus 100 according to the present embodiment processes image data of content externally received or initially embedded to display an image of the content. Although the present embodiment is illustrated with a TV as the display apparatus 100, various kinds of display apparatuses may be used.

One or more users are positioned in front of the display apparatus 100 and watch an image displayed on the display apparatus 100. The display apparatus 100 provides various types of interface environments including a multiple input structure or multiple recognition structure so that users may control an operation of the display apparatus 100.

For example, to realize the multiple input structure, the display apparatus 100 has various kinds of function buttons, a touch pad and a display and includes a remote controller 141 separate from the display apparatus 100, a camera 142 to take an image or picture of an external environment of the display apparatus 100 including a user, and a microphone 143 to receive an utterance/voice input from the user. A user input interface environment of the display apparatus 100 is not limited to the foregoing example, and an input structure not described in the present embodiment may be additionally installed in the display apparatus 100.

The display apparatus 100 performs a preset function or operation based on information input by a user through various multiple input structures.

Hereinafter, a configuration of the display apparatus 100 will be described in detail with reference to FIG. 2.

Figure 2:
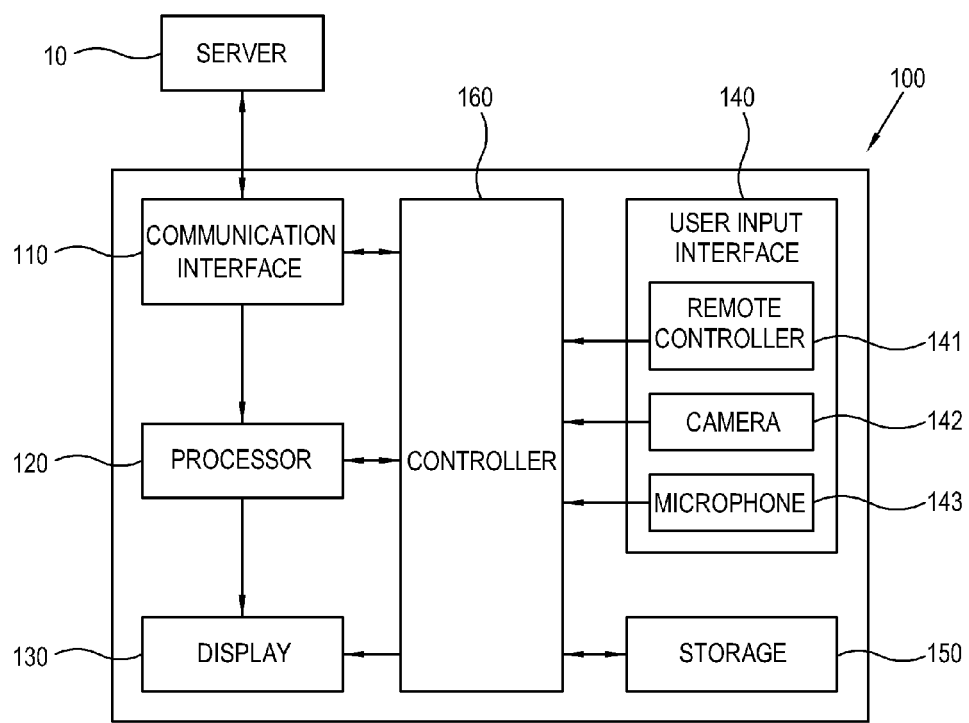
FIG. 2 is a block diagram illustrating a configuration of the display apparatus of FIG. 1.

FIG. 2 is a block diagram illustrating the configuration of the display apparatus 100.

As shown in FIG. 2, the display apparatus 100 according to the present embodiment includes a communication interface 110 to conduct communications to externally transmit and receive data/signals, a processor 120 to process data received by the communication interface 110 according to a preset process, a display 130 to display an image based on image data when the processor 120 processes the image data, a user input interface 140 used by a user to perform an input operation, a storage 150 to store data/information and a controller 160 to control overall operations of the display apparatus 100.

The communication interface 110 conducts data transmission and reception to enable two-way communications with a server 10 or other external devices (not shown). The communication interface 110 connects to the server 10 in a wire-based/wireless wide area network (WAN)/local area network (LAN) or a local access method according to a preset communication protocol.

Since the communication interface 110 may be configured as an assembly of connection ports or connection modules for respective devices, a protocol for connection to the server 10 or an external device (not shown) as a connection target is not limited to a single kind or format. The communication interface 110 may be embedded in the display apparatus 100, or a whole configuration of the communication interface 110 or part of the configuration may be additionally installed in the display apparatus 100 as an add-on or dongle.

Since signal transmission and reception may be achieved according to a protocol specified for each connected device, the communication interface 110 may transmit and receive a signal based on an individual connection protocol for each connected device. For example, in the case of image data, the communication interface 110 may transmit and receive a radio frequency (RF) signal and various signals in accordance with composite video, component video, super video, SCART, high definition multimedia interface (HDMI), DisplayPort, unified display interface (UDI) or wireless HD standards.

The processor 120 performs various processes on data/signals received by the communication interface 110. When the communication interface 110 receives image data, the processor 120 performs an image processing process on the image data and outputs the processed image data to the display 130 to display an image based on the image data on the display 130. When the communication interface 110 receives a broadcast signal, the processor 120 extracts an image, an audio and additional data from the broadcast signal tuned to a particular channel and adjusts the image to a preset resolution to be displayed on the display 130.

The processor 120 may perform any kind of image processing, without being limited to, for example, decoding corresponding to an image format of image data, de-interlacing to convert interlaced image data into a progressive form, scaling to adjust image data to a preset resolution, noise reduction to improve image quality, detail enhancement, frame refresh rate conversion, or the like.

The processor 120 may perform various processes based on data types and characteristics, without being limited to an image processing processes. Further, data to be processed by the processor 120 is not necessarily received by the communication interface 110. For instance, when a user's utterance is input through the user input interface 140, the processor 120 processes the utterance according to a preset audio processing process. When a user's gesture is detected by the user input interface 140, the processor may process a detection result according to a preset gesture processing process.

The processor 120 may be configured as an image processing board (not shown) formed by mounting an integrated multi-functional component, such as a system on chip (SOC), or separate components which independently conduct individual processes on a printed circuit board and be embedded in the display apparatus 100.

The display 130 displays an image based on an image signal/image data processed by the processor 120. The display 130 may be configured in various display modes using liquid crystals, plasma, light emitting diodes, organic light emitting diodes, a surface conduction electron emitter, a carbon nano-tube, nano-crystals, or the like.

The display 130 may further include an additional component depending on a display mode thereof. For example, in a display mode using liquid crystals, the display 130 includes a liquid crystal display (LCD) panel, a backlight unit (not shown) to provide light to the panel and a panel driving board (not shown) to drive the panel.

The user input interface 140 transmits various preset control commands or information to the controller 160 based on a user's manipulations or inputs. The user input interface 140 arranges various events happening by a user based on a user's intent to input information and transmits the information to the controller 160. Here, various forms of events that are performed by a user include, for example, a manipulation, an utterance and a gesture.

The user input interface 140 collectively refers to a configuration of the display apparatus 100 provided to basically transmit a user's intent to the controller 160 so that the controller 160 operates according to the user's intent. Thus, the user input interface 140 is provided to detect information input in an information input mode of the user corresponding to the mode. That is, the user input interface 140 is configured as an assembly of interfaces each corresponding to various user input modes. For example, the user input interface 140 includes the remote controller 141 separate from the display apparatus 100, the camera 142 and the microphone 143.

The storage 150 stores various types of data according to control by the controller 160. The storage 150 is configured as a nonvolatile memory, such as a flash memory and a hard disk drive (HDD), so as to save data regardless of supply of system power. The storage 150 is accessed by the controller 160 to read, record, revise, delete or update pre-stored data.

The controller is configured as a central processing unit (CPU) and controls all components of the display apparatus 100 including the processor 120 as an event happens. For example, when the communication interface receives image data of content, the controller 160 controls the processor 120 to process the image data to be displayed as an image on the display 130. Further, when a user input event happens through the user input interface 140, the controller 160 controls components including the processor 120 so that a preset operation corresponding to the event is performed.

However, with the increase in content available and the advancement of distribution networks, users spend much time and cost in finding needed content among an excessive number of contents, excluding unnecessary content. Accordingly, the display apparatus 100 may provide a content recommendation to enable a user to efficiently use content.

A content recommendation may relate to a method of analyzing user preference for content based on a content use history collected in advance and providing the user with information on content with high user preference among a variety of contents. Here, a process of specifying or distinguishing a user is performed first to analyze preference of the user.

For example, to specify a user, the user may employ a method of inputting an identification (ID) and a password through the remote controller 141 to log in to a user account or user ID previously stored in the storage 150. The display apparatus 100 stores a content use history corresponding to each user ID, and retrieves and provides information on content that a user of a login ID prefers based on a use history corresponding to the login ID.

In such a method, however, since each user ID is provided for each individual person, it is difficult to reflect preferences by groups. For instance, when the display apparatus 100 is a home TV, a single user may watch the display apparatus 100 alone or a plurality of users of a family may watch the display apparatus 100 together. If a plurality of users watches the display apparatus 100 together and login is achieved with an ID of one user, the display apparatus 100 may provide a recommendation service based on preference of the user of the login ID but not provide a recommendation service based on preferences of other users.

Moreover, in logging in with the user ID, a user may experience the inconvenience of having to press individual buttons on the remote controller 141 to input the ID and a password. Thus, a user may choose to use the display apparatus 100 without login due to such inconvenience, in which case the display apparatus 100 is unable to specify the user, making it difficult to provide a recommendation service.

Hereinafter, exemplary embodiments suggested in view of the foregoing aspects will be described.

Figure 3:
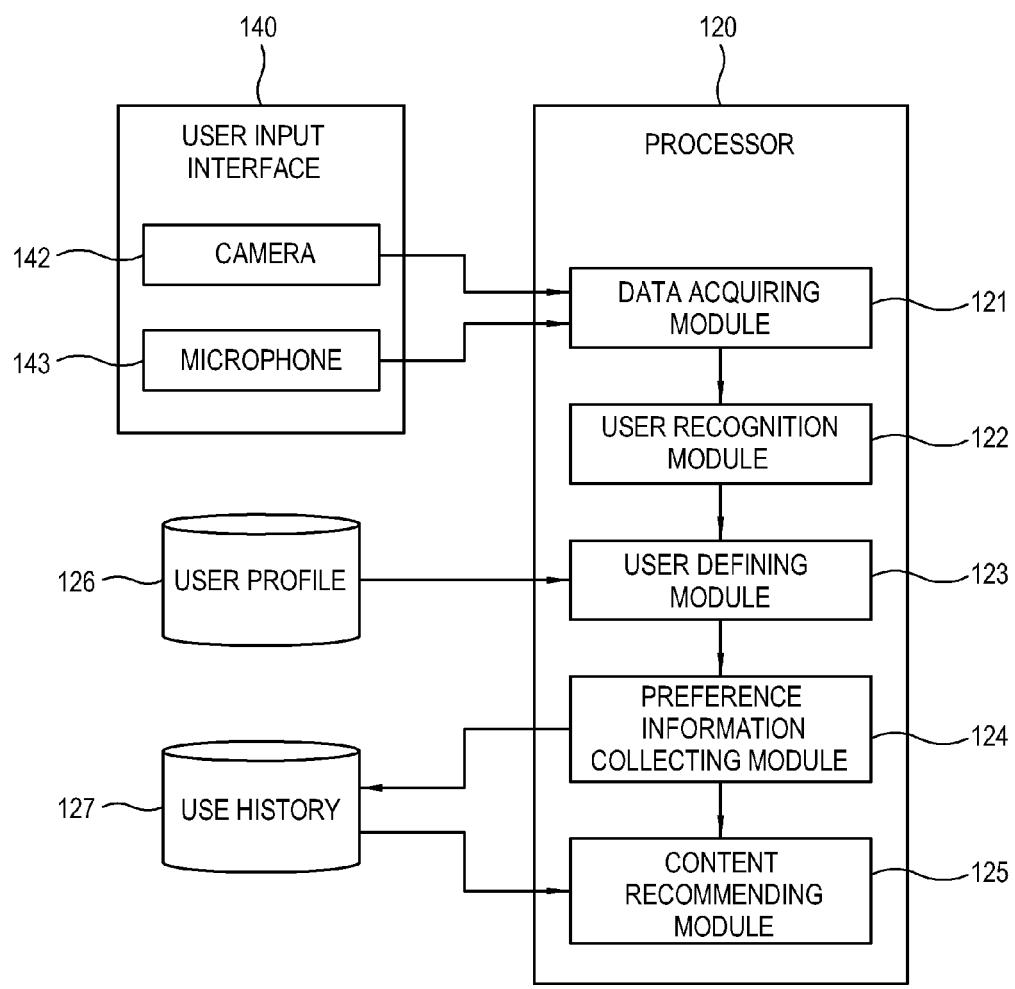
FIG. 3 is a block diagram illustrating a configuration of a processor of the display apparatus shown in FIG. 1.

FIG. 3 is a block diagram illustrating a configuration of the processor 120.

As shown in FIG. 3, the processor 120 includes a data acquiring module 121 to acquire biometric information on a user from the user input interface 140, a user recognition module 122 to analyze the biometric information on the user, a user defining module 123 to specify the user based on an analysis result of the biometric information on the user, a preference information collecting module 124 to collect and store a use history of content that the specified user currently watches, and a content recommending module 125 to select content the specified user prefers from a pre-stored use history to recommend the content to the user.

The modules 121, 122, 123, 124 and 125 are presented in one exemplary embodiment, but this exemplary embodiment is not intended to limit the processor 120 to any one configuration. The modules 121, 122, 123, 124 and 125 may be configured as hardware, or some of the modules may be configured as software. The modules 121, 122, 123, 124 and 125 forming the processor 120 may perform separate operations, respectively, or the processor 120 may sequentially perform all operations without being divided into the modules 121, 122, 123, 124 and 125.

The data acquiring module 121 acquires biometric information on a user transmitted through the user input interface 140. The biometric information on the user refers to information expressing biometric features of the user to distinguish each individual user, for example, image information on the user taken by the camera 142 and voice information on the user input through the microphone 143. Although the data acquiring module 121 acquires both the image information on the user and the voice information on the user in the present embodiment, the data acquiring module 121 may acquire only either of the image information on the user and the voice information on the user.

The biometric information may be acquired by the user input interface 140 unintentionally, unlike being directly input by the user through the remote controller 141.

The user recognition module 122 analyzes the biometric information on the user transmitted from the data acquiring module 121 to drive a feature vector value for specifying the user. For instance, the user recognition module 122 recognizes a face of the user within an image frame obtained by taking a picture of the face of the user to derive a feature vector value of the user face or derive information such as an age or gender of the user from a voice signal of the user. The derived information is used as a feature value to distinguish a particular user among a plurality of preregistered users.

Here, when the biometric information transmitted from the data acquiring module 121 is about a plurality of users, the user recognition module 122 distinguishes biometric information on each user to derive a feature vector value. For example, the user recognition module 122 distinguishes a face area of each user in an image frame obtained by taking a picture of the plurality of users and derives a feature vector value of each distinguished face area, thereby deriving feature vector values by the users.

A method of the user recognition module 122 deriving a feature vector value based on biometric information on a user may employ various algorithms depending on designs, without being particularly limited.

The user defining module 123 retrieves an ID corresponding to a feature vector value derived from biometric information on a user from a previously stored user profile 126. The user profile 126 includes a user ID and a feature vector value corresponding to each user ID. Here, when a feature vector value for each of a plurality of users is transmitted from the user recognition module 122, the user defining module 123 retrieves an ID corresponding to the feature vector value to specify each of the users.

The preference information collecting module 124 collects history information on content currently reproduced and displayed by the display apparatus 100. The history information on the content may include various pieces of information about the content, for example, a title, kind, cast and air time of the content. The preference information collecting module 124 stores the collected history information on the content in a use history 127 to correspond to a specified user ID.

When a plurality of user IDs is specified, the preference information collecting module 124 forms one group ID including the plurality of user IDs and stores the collected history information in the use history 127 to correspond to the group ID, which means a plurality of users is watching content of an image currently displayed on the display apparatus 100 together.

Here, the preference information collecting module 124 updates the use history 127 to specify the plurality of user IDs included in the one group ID. Accordingly, when a plurality of user IDs is detected, it is specified from the record history 127 which group ID includes the user IDs.

The content recommending module 125 retrieves content corresponding to a user ID specified by the user defining module 123 and recommends the content to the user. Here, the content recommending module 125 may derive preference of the user ID for contents in accordance with a preset standard based on the use history 127 and select content with high preference as a recommended content.

For example, preference for content may be derived based on a method of selecting content having a parameter value, such as a category, use time and frequency of use of the content, greater than a preset threshold as a recommended content. In this regard, the content recommending module 125 selects, as a recommended content, content belonging to a category of most-watched content, content broadcast at prime time or most-watched particular content based on a use history of the content corresponding to the specified user ID. Various methods of selecting content with high preference based on the use history 127 may be determined depending on designs, without being limited to the foregoing exemplary embodiment.

Here, when the plurality of user IDs is specified, the content recommending module 125 specifies the group ID including the user IDs from the user history 127. The content recommending module 125 may select a recommended content corresponding to the specified group ID in the same way as the method of selecting a recommended content corresponding to a user ID. Since the history information collected by the preference information collecting module 124 is stored in the use history 127 to correspond to the group ID, the content recommending module 124 may derive preference of the group ID for content based on a content use history of the group ID stored in the use history 127.

Figure 4:
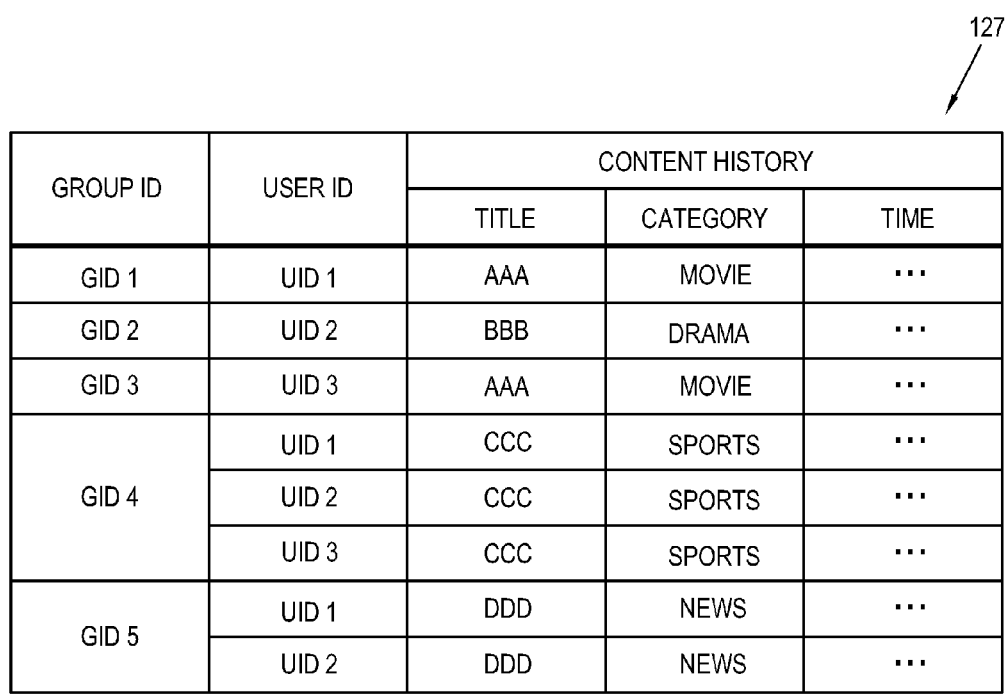
FIG. 4 illustrates a mode of storing a user ID, a group ID and a content use history in the display apparatus of FIG. 1.

FIG. 4 illustrates a mode of storing a user ID, a group ID and a content use history in the use history 127. A data format shown in FIG. 4 is provided merely for illustrative purposes to briefly describe a form of the use history 127. The use history 127 may have a different configuration from the illustrated form and be modified variously as long as the following principles are applicable. Also, the use history 127 may include further complicated data.

As shown in FIG. 4, the use history 127 includes a group ID, at least one user ID included in the group ID and a history of content that the group ID watches. The content history may include various pieces of information about the content, such as a title, category and air time of the content.

The use history 127 includes group IDs, for example, GID1, GID2, GID3, GID4 and GID5. Each group ID includes a user ID, wherein GID1 includes UID, GID2 includes UID2, GID3 includes UID3, GID4 includes UID1, UID2 and UID3, and GID5 includes UID1 and UID2.

GID1, GID2 and GID3 each include a single user ID, in which case a group ID is substantially the same as a user ID.

GID4 and GID5 include a plurality of user IDs. GID4 includes UID1, UID2 and UID3, which means that UID1, UID2 and UID3 watch a content image on the display apparatus 100 together. Thus, content histories respectively corresponding to UID1, UID2 and UID3 of GID4 include the same details. Likewise content histories respectively corresponding to UID1 and UID2 of GID5 include the same details.

When the content recommending module 125 selects a recommended content corresponding to a specified group ID based on the use history 125, one specified user ID means that there is only one user. In this case, the content recommending module 125 selects a group ID corresponding to the specified user ID and selects a recommended content based on a content use history stored to correspond to the selected group ID.

When there is a plurality of specified user IDs, the content recommending module 125 selects a group ID corresponding to the plurality of specified user IDs. For example, if the specified user IDs are two, UID1 and UID2, a group ID corresponding to UID1 and UID2 is GID5, and thus the content recommending module 125 specifies a current user group as GID5. The content recommending module 125 selects a recommended content based on a content use history corresponding to GID5.

Hereinafter, a control method of the display apparatus 100 according to an exemplary embodiment will be described with reference to FIG. 5.

Figure 5:
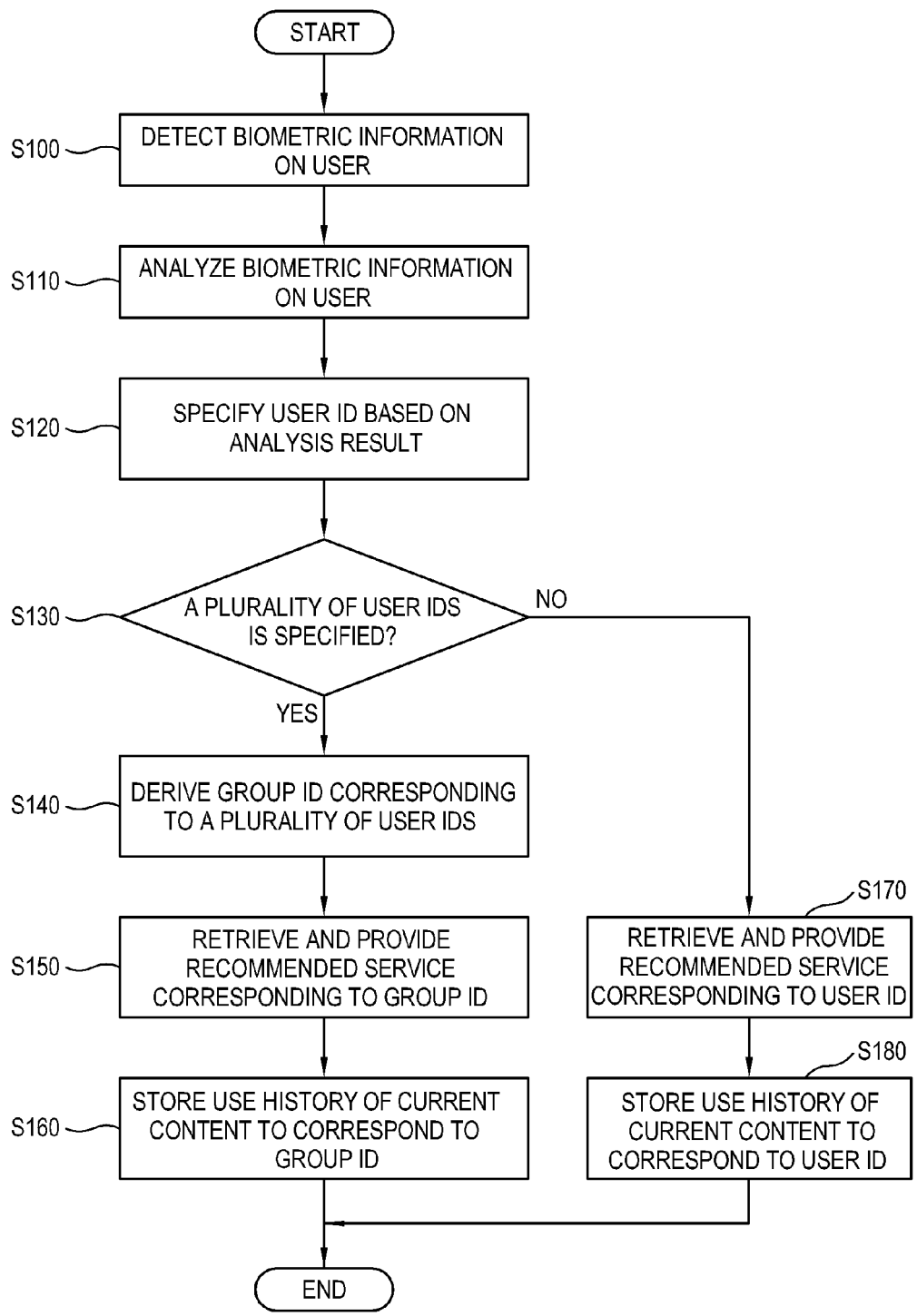
FIG. 5 is a flowchart illustrating a control method of the display apparatus of FIG. 1.

FIG. 5 is a flowchart illustrating the control method of the display apparatus 100.

As shown in FIG. 5, the display apparatus 100 detects biometric information on a user in S100. The display apparatus 100 analyzes the biometric information on the user in S110 and specifies a user ID based on an analysis result in S120.

The display apparatus 100 determines whether a plurality of user IDs is specified in S130.

When a plurality of user IDs is specified, the display apparatus 100 derives a group ID corresponding to the plurality of user IDs in S140. The display apparatus 100 retrieves and provides a recommended content for the group ID based on a pre-stored use history in S150. The display apparatus 100 stores a use history of the current content to correspond to the group ID in S160.

When a single user ID is specified, the display apparatus 100 retrieves and provides a recommended content for the user ID in S170. The display apparatus 100 stores a use record of the current content to correspond to the user ID in S180.

In this way, even when there is a plurality of users, the display apparatus 100 may provide a recommended content in view of preferences of the users.

However, the following situation may be considered in the aforementioned exemplary embodiment.

For example, when a user group including three users watches the display apparatus 100, all of the users may watch a content image displayed on the display apparatus 100 but some of the users may not pay attention to the content image. If one user is sleeping and not paying attention to the image, the display apparatus 100 may select a user currently watching the content image, without considering the sleeping user. That is, in this case, the display apparatus 100 may need to provide a recommended content in view of a new user group including two users currently watching the content image with attention, instead of a recommended content for the user group including all three users.

In the foregoing exemplary embodiment, however, the display apparatus 100 deals with a user group including all detected users only but does not selectively deal with users paying attention to a currently displayed image among the detected users.

Thus, in specifying a user group including detected users, an image processing apparatus or display apparatus 100 is required to distinguish and filter dummy data to be included in the user group, which will be described in a second exemplary embodiment.

Figure 6:
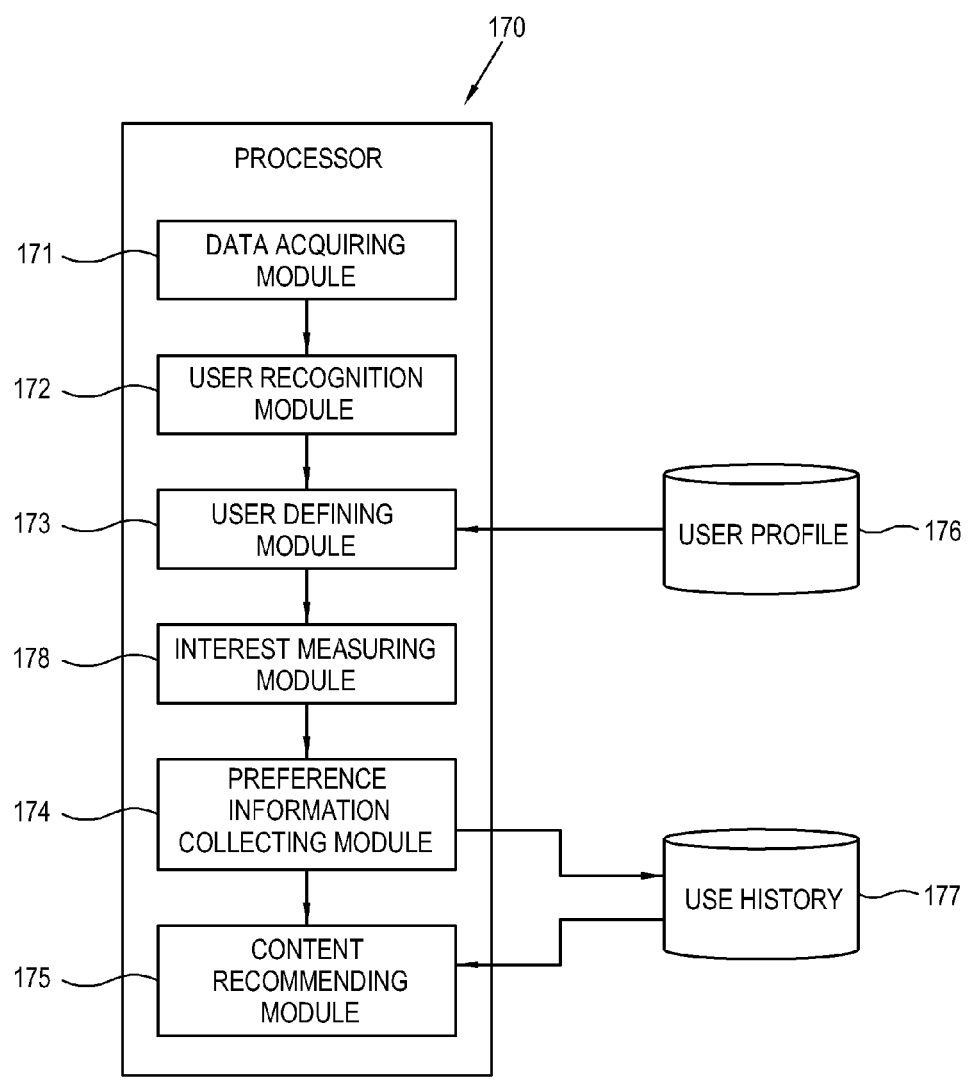
FIG. 6 is a block diagram illustrating a configuration of a processor according to a second exemplary embodiment.

FIG. 6 is a block diagram illustrating a configuration of a processor 170 according to the second exemplary embodiment.

As shown in FIG. 6, the processor 170 includes a data acquiring module 171, a user recognition module 172, a user defining module 173, a preference information collecting module 174 and a content recommending module 175. These components of the processor 170 may be substantially the same as those illustrated in the first exemplary embodiment, and thus descriptions thereof will be omitted herein. The processor 170 according to the present embodiment may be applied to the display apparatus 100, in place of the processor 120 of the first exemplary embodiment.

Here, the processor 170 further includes an interest measuring module 178 to measure interest of each user corresponding to a user ID specified by the user recognition module 173.

When there is a plurality of specified user IDs, the interest measuring module 178 measures commitment or interest of users corresponding to the respective user IDs in an image currently displayed on the display apparatus 100. Here, the interest measuring module 178 derives interest of each corresponding user based on a feature vector value of the user derived by the user recognition module 172.

Commitment or interest is a numerical parameter obtained by quantitating how much a user is interested in or committed to a content image currently displayed on the display apparatus 100. Interest is obtained by quantitating a subjective feeling of a user and thus is derived based on various expression modes of a user who shows feelings.

The interest measuring module 178 selects a user ID of a user determined to have high interest among the plurality of specified user IDs based on a result of measuring interest of each user.

In specifying a group ID including a plurality of user IDs from a use history 177, the content recommending module 175 selects a group ID including a user ID of a user determined to have high interest by the interest measuring module 178 and selects a recommended content corresponding to the selected group ID. The content recommending module 175 of the present embodiment is distinguished from that of the first exemplary embodiment in that the content recommending module 175 excludes a user ID of a user having low interest among the user IDs specified by the user recognition module 172 when specifying a group ID.

For instance with reference to FIG. 4, when three user IDs, UID1, UID2 and UID3, are specified, a recommended content for GID4 as a group ID corresponding to the three user IDs of UID1, UID2 and UID3 is provided in the first exemplary embodiment. In the present embodiment, however, if a user with UID3 is considered to have low preference, a recommended content for GID5 as a group ID corresponding to user IDs UID1 and UID2 is provided.

As described above, the present embodiment may exclude a user ID of a user having low interest among the specified user IDs, thereby providing a recommended content specialized for a user having high interest.

The preference information collecting module 174 selects a user ID determined to have high interest by the interest measuring module 178 when there is the plurality of specified user IDs. The preference information collecting module 174 updates collected history information in the use history 177 to correspond to a group ID corresponding to the selected user ID.

When the group ID corresponding to the selected user ID is absent in the use history 177, the preference information collecting module 174 generates and stores a new group ID in the use history 177.

Meanwhile, the interest measuring module 178 may use various methods of measuring interest of a user corresponding to each user ID in an image currently displayed on the display apparatus 100.

For instance, the interest measuring module 178 categorizes one or more motions of a user, such as a body position, a direction or eyes and a direction of a face, converts a plurality of motions in each category into numeric values and adds up the values, thereby deriving interest of the user. The interest measuring module 178 determines the interest of the user as high when the derived interest is a preset threshold or greater, and determines the interest of the user as low when the interest is smaller than the threshold.

To use the body position as an example, when the body of the user is directed straight at the display apparatus 100, that is, when an angle between a line in a direction in which the body of the user looks and a forward normal line of the display apparatus 100 is 0 degrees, the interest is given a highest value. When the angle is greater than a preset value, the interest is given a lowest value.

Regarding the direction of the eyes of the user, when the eyes of the user are directed straight at the display apparatus 100, the interest is given a highest value. When an angle between a line in a direction in which the eyes of the user look and a line in a forward direction of the display apparatus 100 is greater than a preset value or when the user close the eyes, the interest is given a lowest value.

Regarding the direction of the face of the user, when the face of the user is directed straight at the display apparatus 100, the interest is given a highest value. When an angle between a line in a direction in which the face of the user looks and the line in the forward direction of the display apparatus 100 is greater than a preset value, the interest is given a lowest value.

Interest values by categories of a user are added up, thereby deriving a final interest value of the user. The interest measuring module 178 determines interest of the user as high when the final interest value is a preset threshold or greater, and determines the interest of the user as low when the final interest value is smaller than the threshold. The interest measuring module 178 selects only a user ID of a user having high interest among a plurality of users having specified user IDs and selects a group ID corresponding to the selected user ID.

As described above, the interest measuring module 178 measures interest of a user in an image displayed on the display apparatus 100 based on various motions of the user. Various parameters may be employed for measuring interest without being limited to the foregoing examples.

Hereinafter, a control method of the display apparatus 100 according to an exemplary embodiment will be described with reference to FIGS. 7 and 8.

Figure 7:
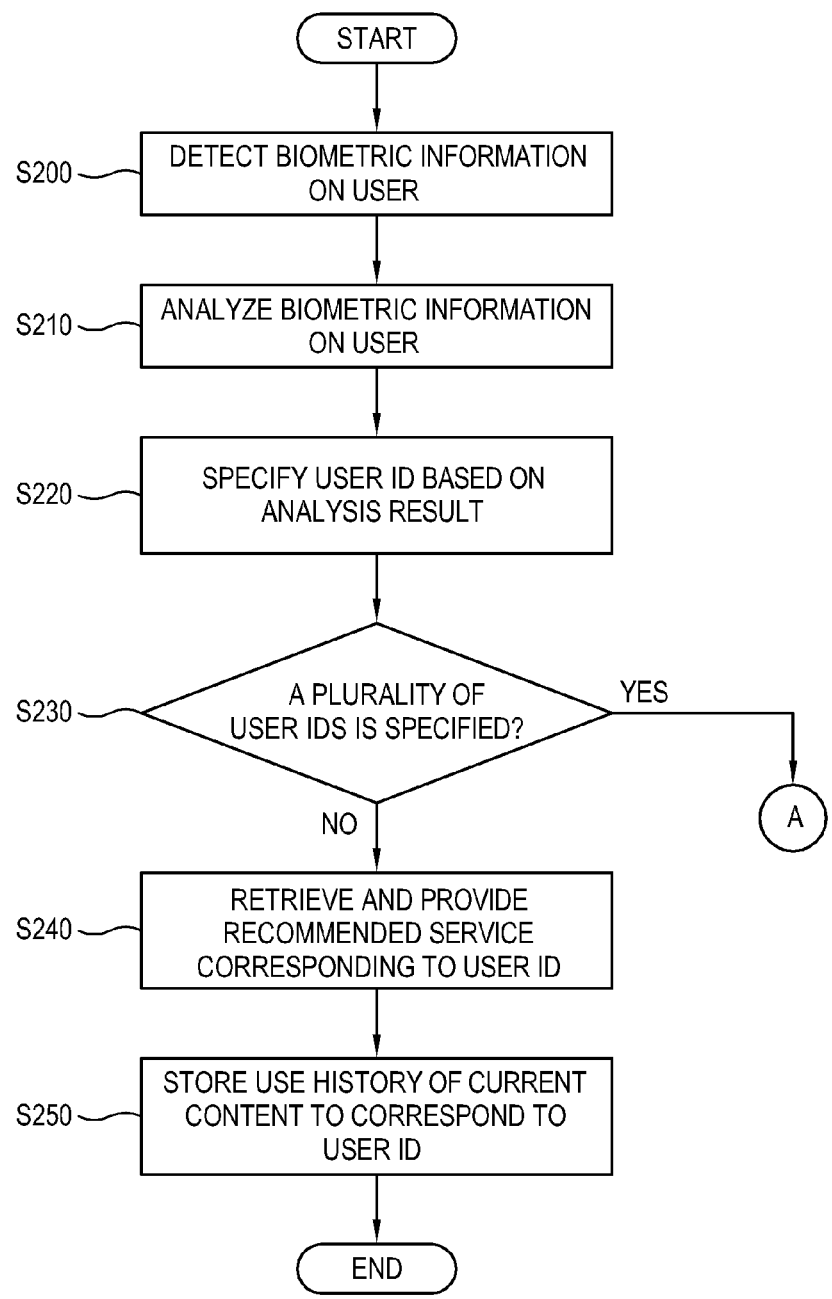
FIGS. 7 and 8 are flowcharts illustrating a control method of a display apparatus which includes the processor of FIG. 6.
Figure 8:
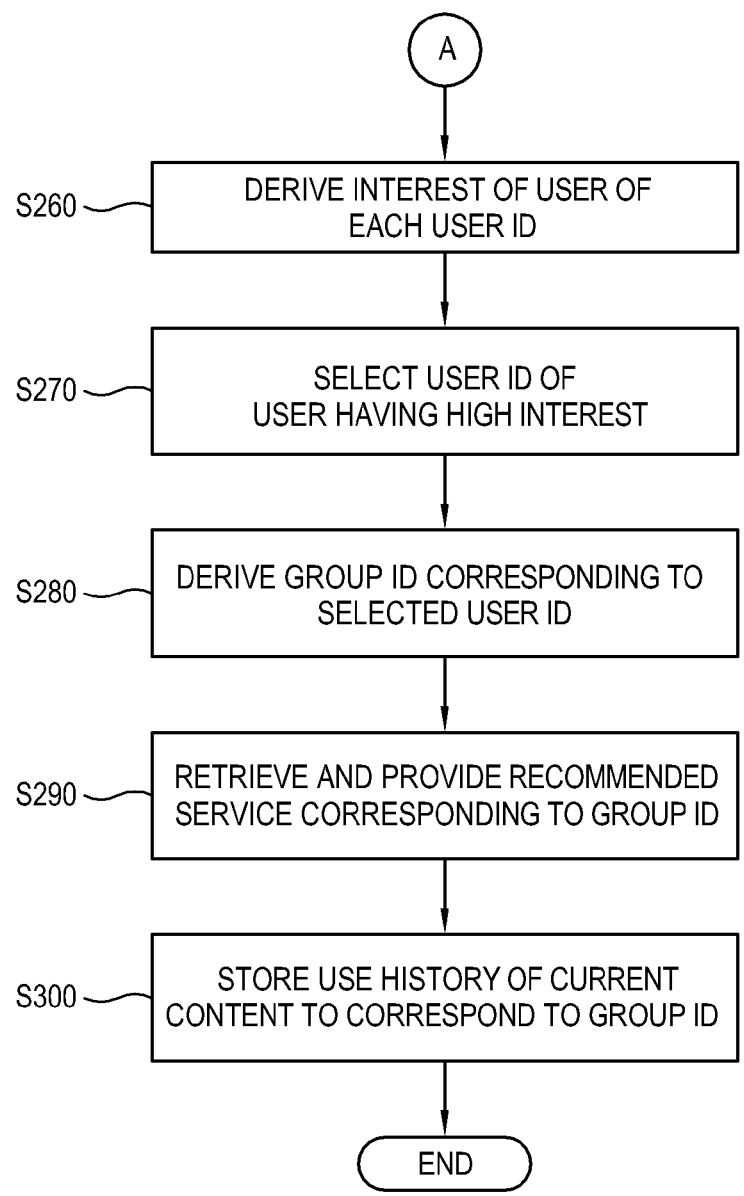

FIGS. 7 and 8 are flowcharts illustrating the control method of the display apparatus 100.

As shown in FIG. 7, the display apparatus 100 detects biometric information on a user in S200. The display apparatus 100 analyzes the biometric information on the user in S210 and specifies a user ID based on an analysis result in S220.

The display apparatus 100 determines whether a plurality of user IDs is specified in S230.

When a single user ID is specified, the display apparatus 100 retrieves and provides a recommended content for the user ID in S240. The display apparatus 100 stores a use record of the current content to correspond to the user ID in S250.

As shown in FIG. 8, when a plurality of user IDs is specified, the display apparatus 100 derives interest of a user with each specified user ID based on the analysis result of the biometric information on the user in S260. The display apparatus 100 selects a user ID of a user having high interest in S270. The display apparatus 100 derives a group ID corresponding to the selected user ID in S280.

The display apparatus 100 retrieves and provides a recommended content for the group ID based on a pre-stored use history in S290. The display apparatus 100 stores a use history of the current content to correspond to the group ID in S300.

As described above, when a plurality of users is detected, the display apparatus 100 according to the present embodiment may determine interest of each user in an image currently displayed on the display apparatus 100 and provide a recommended content for a user determined to have high interest.

Although the foregoing exemplary embodiment shows that the display apparatus 100 selects a user having high interest among a plurality of users and provides a recommended content to the selected user, the display apparatus 100 may provide the user having high interest with not only the recommended service but also various services.

In FIG. 4, not only the content histories but also a display configuration or a command to control power of an external device may be stored corresponding to the group IDs and the user IDs. The display configuration may enable, for example, adjusting size or color of a UI icon, adjusting brightness of an image or adjusting volume of a sound.

For instance, consider that a command set to increase brightness of an image is mapped onto a group ID GID4 and a command to turn on an external device to operate is mapped onto a group ID GID5 in the use history. When the group ID is determined as GID4 as a result of determining preference, the display apparatus 100 increases brightness of a currently displayed image based on the use history. When the group ID is determined as GID5 as a result of determining preference, the display apparatus 100 turns on an external device to operate based on the use history.

As such, when a group ID of a user determined to have high interest is specified, the display apparatus 100 may apply a command or configuration predefined in the use history to correspond to the group ID.

As described above in the exemplary embodiments, the display apparatus 100 stores a personal ID of each individual user and a group ID of a user group including a plurality of users corresponding to the personal IDs and provides a preset service to any authenticated one of the personal IDs and the group ID. Here, the display apparatus 100 specifies a personal ID corresponding to biometric information on at least one user, and selects and authenticates a group ID corresponding to specified personal IDs if a plurality of personal IDs is specified. Here, the display apparatus derives interest of the plurality of users corresponding to the respective specified personal IDs in a currently displayed image and selects a group ID corresponding to a personal ID of a user determined to have high interest.

Accordingly, specialized services for users having high interest may be provided.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. An image processing apparatus comprising:
    a user input interface configured to input biometric information of a plurality of users;
    a display configured to display an image based on image data; and
    a controller configured to:
    identify the plurality of users who are watching the image displayed on the display based on the biometric information of the plurality of users input through the user input interface,
    determine at least one user of the identified plurality of users, which concentration on the displayed image is high relative to the other of the identified plurality of users,
    determine a content corresponding to a group comprising the determined at least one user of the identified plurality of users, and
    display an image of the determined content on the display,
    wherein the controller is further configured to give the concentration a highest value when an angle between a line in a direction in which at least one from among a body, a face, and eyes of the at least one user is pointed and a forward normal line of the image is 0 degrees, and to give the concentration a lower value when the angle becomes wider.

2. The image processing apparatus of claim 1, wherein the controller is further configured to determine the concentration of the at least one user based on a motion of the at least one user indicated by the biometric information of the at least one user.

3. The image processing apparatus of claim 1, wherein the controller is further configured to determine that the concentration is high when the concentration is greater than a preset threshold.

4. The image processing apparatus of claim 1, wherein the controller is further configured to determine the concentration based on at least one from among a body position of the at last one user, a direction in which the eyes of the at least one user look, and a face position of the at least one user.

5. The image processing apparatus of claim 1, further comprising:
    a storage configured to store information on the plurality of users and the group comprising the determined at least one user of the identified plurality of users,
    wherein the storage is further configured to store a content use history of the group, and
    wherein the controller is further configured to determine the contend corresponding to the group based on the content use history of the group stored in the storage.

6. The image processing apparatus of claim 5, wherein the content corresponding to the group comprises a content watched a preset number of times or more among contents in the content use history.

7. The image processing apparatus of claim 5, wherein the controller is further configured to update the content use history of the group to include content information on an image currently displayed on the display.

8. The image processing apparatus of claim 1, wherein the user input interface comprises a camera, and the biometric information of the at least one user comprises image information of the at least one user taken by the camera.

9. The image processing apparatus of claim 1, wherein the user input interface comprises a microphone, and the biometric information of the at least one user comprises voice information of the at least one user input received through the microphone.

10. A control method of an image processing apparatus, the control method comprising:
 displaying an image;
 receiving biometric information of a plurality of users;
 identifying the plurality of users who are watching the displayed image based on the biometric information of the plurality of users;
 determining at least one user of the identified plurality of users, whose concentration on the displayed image is high relative to the other of the identified plurality of users,
 determining a content corresponding to a group comprising the determined at least one of the identified plurality of users; and
 displaying an image of the determined content,
 wherein the determining the content corresponding to the group further comprises giving the concentration a highest value when an angle between a line in a direction in which at least one from among a body, face and eyes of the at least one user is pointed and a forward normal line of the image is 0 degrees, and giving the interest a lower value when the angle becomes wider.

11. The control method of claim 10, wherein the determining the content corresponding to the group further comprises determining the concentration based on a motion of the at least one user indicated in the biometric information on the at least one user.

12. The control method of claim 10, wherein the determining the content corresponding to the group further comprises determining that the concentration is high when the concentration is greater than a preset threshold.

13. The control method of claim 10, wherein the determining the content corresponding to the group further comprises determining the concentration based on at least one of a body position of the at least one user, a direction in which the eyes of the at least one user look, and a face position of the at least one user.

14. The control method of claim 10, further comprising:
 storing a content use history of the group, wherein the determining the content corresponding to the group further comprises determining the content corresponding to the group based on the content use history of the group.

15. The control method of claim 14, wherein the determining the content corresponding to the group further comprises determining that the content corresponding to the group comprises a content watched a preset number of times or more among contents in the content use history.

16. The control method of claim 14, further comprising updating the content use history of the group to include content information on an image currently displayed.

17. The control method of claim 10, wherein the biometric information of the at least one user comprises image information of the at least one user taken by a camera.

18. The control method of claim 10, wherein the biometric information of the at least one user comprises voice information of the at least one user input through a microphone.

* * * * *